United States Patent [19]
Alanara et al.

[11] Patent Number: 5,878,351
[45] Date of Patent: Mar. 2, 1999

[54] METHODS AND APPARATUS FOR PROVIDING DELAYED TRANSMISSION OF SMS DELIVERY ACKNOWLEDGEMENT, MANUAL ACKNOWLEDGEMENT AND SMS MESSAGES

[75] Inventors: Seppo Alanara, Oulu, Finland; Steven Willhoff, Richardson, Tex.

[73] Assignee: Nokia Mobile Phones Limited, Salo, Finland

[21] Appl. No.: 747,019

[22] Filed: Nov. 7, 1996

[51] Int. Cl.$^6$ ..................................................... H04O 7/20
[52] U.S. Cl. .......................... 455/466; 455/412; 455/31.3; 455/561
[58] Field of Search .................................. 455/466, 31.1, 455/31.2, 31.3, 414, 418, 458, 412, 561, 550, 514

[56] References Cited

U.S. PATENT DOCUMENTS

| | | | |
|---|---|---|---|
| H610 | 3/1989 | Focarile et al. | 379/60 |
| 4,644,351 | 2/1987 | Zabarsky et al. | 340/825.44 |
| 5,175,758 | 12/1992 | Levanto et al. | 379/57 |
| 5,471,655 | 11/1995 | Kivari | 455/127 |
| 5,604,921 | 2/1997 | Alanara | 455/45 |
| 5,678,179 | 10/1997 | Turcotte et al. | 455/466 |
| 5,692,032 | 11/1997 | Seppanen et al. | 455/466 |
| 5,794,142 | 8/1998 | Vanttila et al. | 455/419 |

FOREIGN PATENT DOCUMENTS

WO 92/4797   3/1992   WIPO.

OTHER PUBLICATIONS

"European digital cellular telecommunications system (Phase 2); Unstructured Supplementary Service Data (USSD)–Stage 3 (GSM 04.90)", ETSI, Final Draft, Nov. 1994.

"European digital cellular telecommunications system (Phase 2); Stage 1 description of Unstructured Supplementary Service Data (USSD) (GSM 02.90)", ETSI, ETS 300 625, Jan. 1995.

"SMS Cellular Messaging Teleservice (CMT)", IS–136.1 (Nov. 14, 1994) & IS–136.1 Addendum (Apr. 26, 1995).

Over–the–Air Activation Teleservice (OATS), PN–3474.1, Dec. 15, 1995.

"Short message Terminals Compliant with IS–136 and IS–137", TDMA Forum, Implementation Guide, Verson 7.0, p. 3, Apr. 20, 1995.

*Primary Examiner*—Willis R. Wolfe
*Assistant Examiner*—Hieu T. Vo
*Attorney, Agent, or Firm*—Perman & Green, LLP

[57] ABSTRACT

A method is disclosed for operating a cellular communications system of a type that comprises a Base Station/Mobile Switching Center/Interworking function (BMI), a message center (MC), and at least one mobile station. The method includes the steps of transmitting a point-to-point message (e.g., a SMS message), or a point-to-multipoint message (e.g., a Broadcast SMS message), from the MC via the BMI to the mobile station; buffering an acknowledgement message in the mobile station when it is determined by the mobile station that the acknowledgement message either cannot be transmitted, or cannot be transmitted in its entirety; and then subsequently automatically transmitting the buffered acknowledgement message when transmission becomes possible. Also disclosed is a method for buffering user-originated SMS messages in the mobile station until the SMS message can be transmitted to the network.

20 Claims, 4 Drawing Sheets

METHODS AND APPARATUS FOR PROVIDING DELAYED TRANSMISSION OF SMS DELIVERY ACKNOWLEDGEMENT, MANUAL ACKNOWLEDGEMENT AND SMS MESSAGES

FIELD OF THE INVENTION

This invention relates generally to radiotelephones and, in particular, to radiotelephones or mobile stations capable of operation with a digital cellular network.

BACKGROUND OF THE INVENTION

The so-called Short Message Service (SMS) is a point-to-point or point-to-multipoint service which enables a user to send messages to and receive text messages from other users of a communications network. The SMS attempts to deliver a message to a mobile terminal whenever the terminal is registered to the network, even when the terminal is engaged in a voice or data call. The terminal may also roam throughout the network and still be capable of sending and receiving messages. A terminal configured for SMS provides methods for the user to receive, read, write/edit, clear, send, and save messages. The connection of a standard keyboard to the terminal facilitates the generation and editing of text messages by the user.

The network stores messages in at least one Message Center (MC), and Mobile Terminated (MT) messages are sent to the terminal by the MC. Various SMS protocol layers receive the messages and check their contents. If the contents are valid, and assuming that there is room for incoming text messages in the memory of the terminal, the message is received and stored. Otherwise, the message is rejected. U.S. Pat. No. 4,644,351 (Zabarsky et al.) discloses a paging system that enables messages to be sent to a remote unit, and which has a capability for the remote unit to transmit a message-received acknowledgement signal back to a central site. The paging system of Zabarsky et al. also enables a message-presented verification to be transmitted from an addressed pager back to the central site.

Reference can be had to the TIA Interim Standards IS-136 and IS-137, and also to a document entitled "TDMA Forum, Implementation Guide: Short Message Terminals Compliant With IS-136 and IS-137" (Ed. D. Holmes, vers. 7.0, Apr. 20, 1995). These documents specify one type of SMS and the various system and terminal level protocols required to provide SMS. This latter document describes in sections 3.2.1 and 3.2.2 a Delivery Acknowledgement and a Manual Acknowledgement capability, respectively. By example, a message "Can you meet me this evening? <NTC>Yes<NTC>No", where NTC is a non-text character, is said would allow the user to select a response from "Yes" or "No", and consequently cause the terminal to send response codes 0 or 1.

Reference may also be had to IS-136.1, Rev. A, Feb. 12, 1996, Section 7 (Point-to-Point Teleservices), for a description of SMS Deliver, SMS Delivery ACK, and SMS Manual ACK message formats and protocols. When the SMS Delivery ACK is specified, the mobile station automatically transmits the acknowledgement message upon delivery (i.e., display) of a stored SMS message to the user. When the SMS Manual ACK is specified, the mobile station transmits the acknowledgement message, and the user's response, after delivery and the user's input.

Another type of SMS is known as broadcast SMS (or also as S-BCCH), which is a point-to-multipoint operation (i.e., from a network operator to a plurality of mobile stations). Reference may had to, by example, a publication entitled "S-BCCH for IS-136", TR45.3.6/95.06.13/8, Digital Cellular Systems, Jun. 12–15, 1995 (Ericsson).

A problem arises when a mobile station has received and stored a SMS message that requires an acknowledgement, either Delivery ACK or Manual ACK, and then subsequently moves outside of the cellular coverage area. In this case the mobile station is unable to respond to the SMS message. For example, the mobile station may simply present a message to the user to inform the user that the required acknowledgement cannot be sent. It is then up to the user to manually retry the acknowledgement message at a later time when a connection with a network is reestablished. For obvious reasons, this solution is less than optimum, and may result in the existence of non-acknowledged SMS messages.

Also in this case the message center may retransmit the SMS message if a message center acknowledgement timer expires without an expected acknowledgement being received. As can be appreciated, the retransmission of non-acknowledged SMS messages consumes valuable network capacity and Digital Control Channel (DCCH) bandwidth.

A similar problem can arise, when the connection with the network is not lost or if a connection to a different network is established, if the DCCH is for some reason not accepting uplink R-Data, or if the acknowledgement message exceeds a length (number of characters defined in an R-Data Message Length information element) that the serving DCCH is willing to accept. R-Data is defined in IS-136.1, Rev. A, Section 6.4.4.9, as being a relay message used to carry point-to-point teleservice messages, such as the SMS Cellular Messaging Teleservice (CMT).

A related problem is experienced for mobile station originated SMS messages when it is determined that a user-composed SMS message cannot be transmitted, either because there currently is no service, or the serving network does not support mobile station originated SMS transmissions.

OBJECTS OF THE INVENTION

It is thus a first object of this invention to provide a mobile station executed method for buffering, and subsequently automatically transmitting, SMS messages or SMS acknowledgement messages in a digital cellular system.

It is a second object of this invention to provide a mobile station having a memory and a controller for buffering, and subsequently automatically transmitting, SMS messages or SMS acknowledgement messages in a digital cellular system.

SUMMARY OF THE INVENTION

The foregoing and other problems are overcome and the objects of the invention are realized by methods and apparatus in accordance with embodiments of this invention.

A method of this invention is disclosed for operating a cellular communications system of a type that comprises a Base Station/Mobile Switching Center/Interworking function (BMI), a message center (MC), and at least one mobile station. The method includes the steps of transmitting a point-to-point message (e.g., a SMS message), or a point-to-multipoint message (e.g., a Broadcast SMS message), from the MC via the BMI to the mobile station; buffering an acknowledgement message in the mobile station when it is determined by the mobile station that the acknowledgement message either cannot be transmitted, or cannot be transmitted in its entirety; and then subsequently automatically transmitting the buffered acknowledgement message when transmission becomes possible. Further in accordance with this invention there is disclosed a method for operating a mobile station of a type that is operable with a cellular communications system, comprising the steps of: (a) composing a point-to-point message in the mobile station; (b) determining if the composed message can be transmitted to the cellular communications system; (c) if not, buffering the composed message in the mobile station for transmission when the message can be transmitted; and (d) subsequently automatically transmitting the buffered message when the mobile station determines that the message can be transmitted. The step of buffering includes the optional steps of querying a user for at least one delayed transmission parameter, such as a latest time that the buffered message can be transmitted; storing at least one user-entered delayed transmission parameter in the mobile station; and subsequently automatically transmitting the buffered message in accordance with the stored at least one delayed transmission parameter.

In both methods the steps of transmitting use an R-Data message, such as a SMS message or a SMS ACK message.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
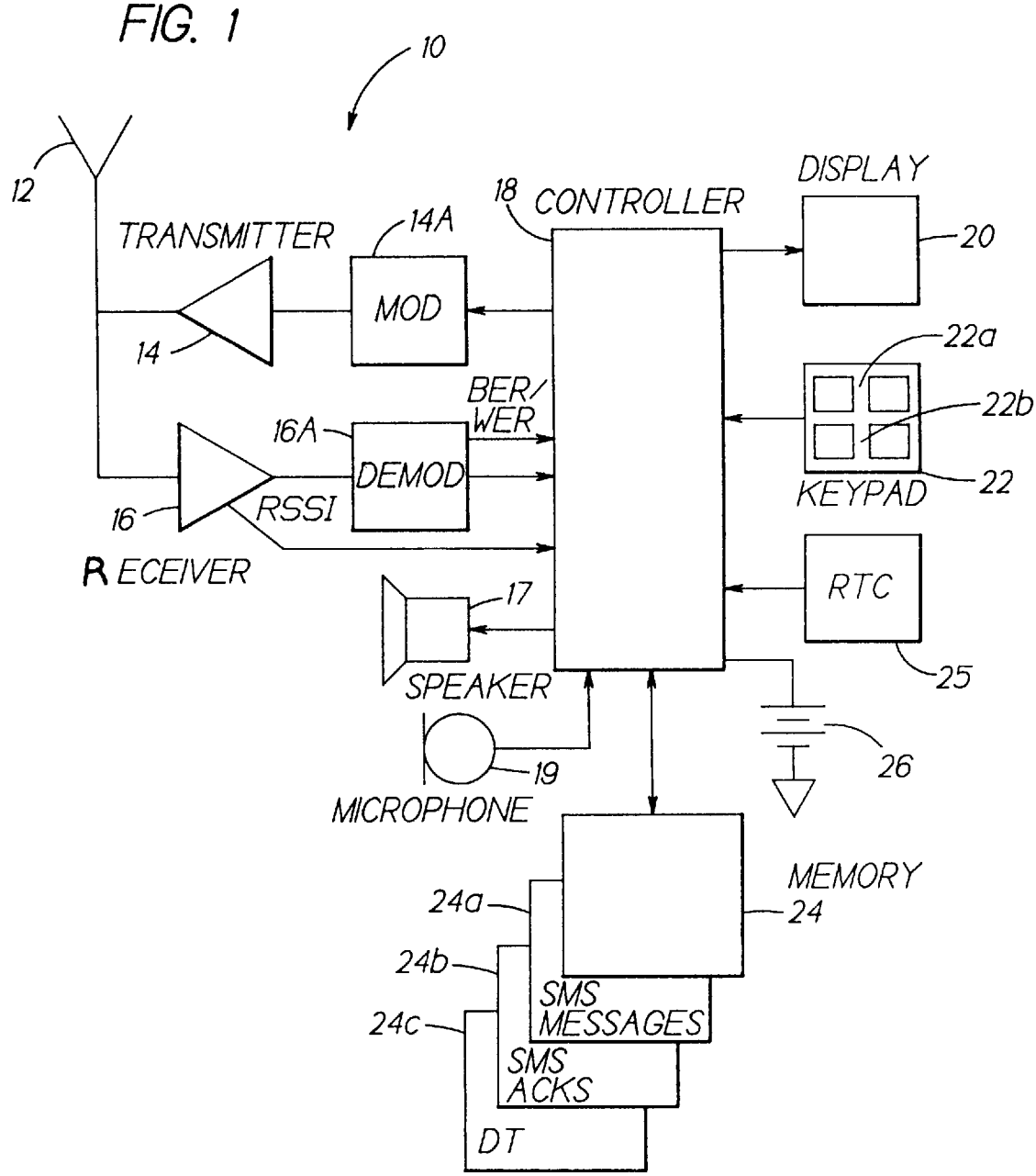
FIG. 1 is a block diagram of a mobile station that is constructed and operated in accordance with this invention.
Figure 2:
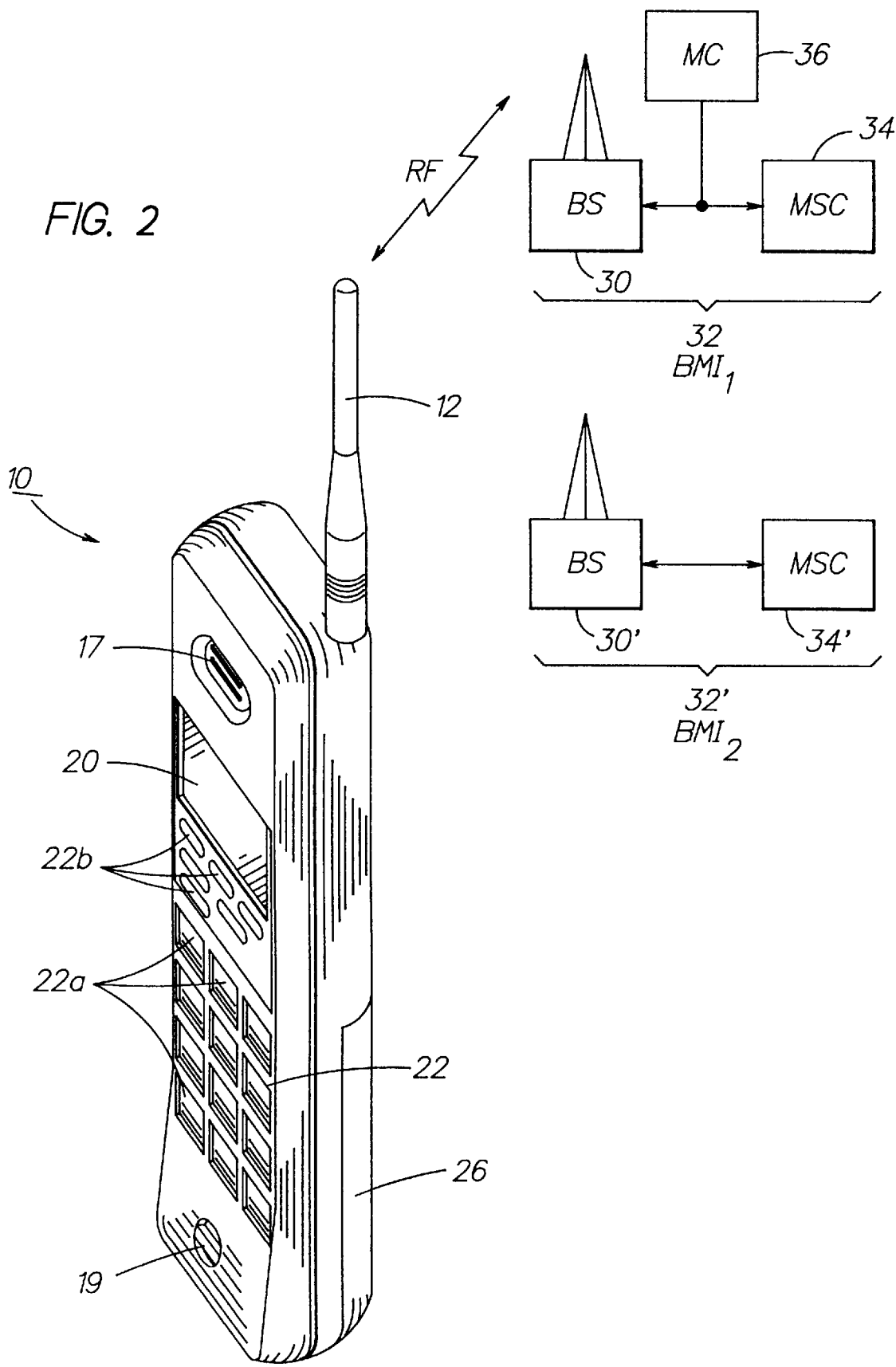
FIG. 2 is an elevational view of the mobile station shown in FIG. 1, and which further illustrates a cellular communication system to which the mobile station is bidirectionally coupled through wireless RF links.

Reference is made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a first base site or base station 30. The base station 30 is a part of a first cellular network comprising a Base Station/Mobile Switching Center/Interworking function (BMI$_1$) 32 that includes a mobile switching center (MSC) 34 and a Message Center (MC) 36. The MSC 34 provides a connection to landline trunks when the mobile station 10 is involved in a call. FIG. 2 also shows a second BMI$_2$ 32', having associated base station(s) 30' and MSC 32'. The second BMI 32' may or may not include a message center.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a physical and logical frame structure of a type that was described above, although the teaching of this invention is not intended to be limited only to this specific structure, or for use only with an IS-136 compatible mobile station, or for use only in TDMA type systems.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including point-to-point and Broadcast SMS messages 24a, that are received from the BMI 32 prior to the display of the messages to the user. In accordance with an aspect of this invention, the memory 24 also stores, when required, any SMS acknowledgement (ACK) messages 24b, such as Delivery ACK and Manual ACK, that cannot be sent when required. Typically, the Delivery ACK message is intended to be transmitted when a corresponding SMS message, which specifies Delivery ACK, is displayed to the user. The Manual ACK is intended to be transmitted in response to an input from the user after reading the corresponding SMS message. Preferably the SMS messages 24a and the buffered acknowledgements 24b are stored in a non-volatile portion of the memory 24 so that this information is not lost should power be removed.

In greater detail, and referring to an IS-136 embodiment, the SMS Manual ACK message is defined to be sent from a mobile station as a result of the user responding to a previously received SMS Deliver message. The mobile station 10 sets a Message Reference in the SMS Manual ACK to the Message Reference in the SMS Deliver message that is being user acknowledged. In addition, the mobile station 10 sets the User Destination Address and User Destination Subaddress in the R-DATA message (see, for example, Section 6.4.3.11) in which the SMS Manual ACK is sent to the User Originating Address (if included) and User Originating Subaddress (if included) in the R-DATA message in which the SMS Deliver message being acknowledged was received.

Reference may also be had to, by example, commonly assigned U.S. patent application Ser. No. 08/562,900, filed Nov. 27, 1995, entitled "Mobile Terminal Having One Key User Message Acknowledgment Function" by J. Sappänen, J. Vaihoja, M. Lietsalmi, and J. Vänttilä.

Reference can also be had to commonly assigned and allowed U.S. patent application Ser. No. 08/499,165, filed Jul. 7, 1995, entitled "Radiotelephone User Interface for Broadcast Short Message Service" by Seppo Alanärä, now U.S. Pat. No. 5,604,921 issued Feb. 18, 1997.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with any of a number of other standards besides IS-136, such as GSM and IS-95 (CDMA). Some narrow-band AMPS (NAMPS), as well as TACS, mobile stations may also benefit from the teaching of this invention, as should dual or higher mode phones (e.g., digital/analog or TDMA/CDMA/analog phones). It should thus be clear that the teaching of this invention is not to be construed to be limited to any one particular type of mobile station or air interface standard.

The operating program in the memory 24 includes routines to present messages and message-related functions to the user on the display 20, typically as various menu items. The memory 24 also includes routines for implementing the methods described below in relation to FIGS. 3 and 4.

In a first aspect, a presently preferred embodiment of this invention employs point-to-point or point-to-multipoint teleservices that build upon the R-DATA message (see Sections 2.7.3.1.3.2.19 and 3.7.3.1.3.2.23 of IS-136.2, and Sections 6.4.3.11 and 6.4.4.9 of IS-136.1). Each teleservice is identified by a unique value of the higher layer protocol identifier field within the R-DATA unit information element that is included within the R-DATA message. Of most interest herein is the Cellular Messaging Teleservice (CMT), in particular a SMS function that requires either that the Delivery ACK or Manual ACK be transmitted by the mobile station 10 after message presentation to a user.

Figure 3:
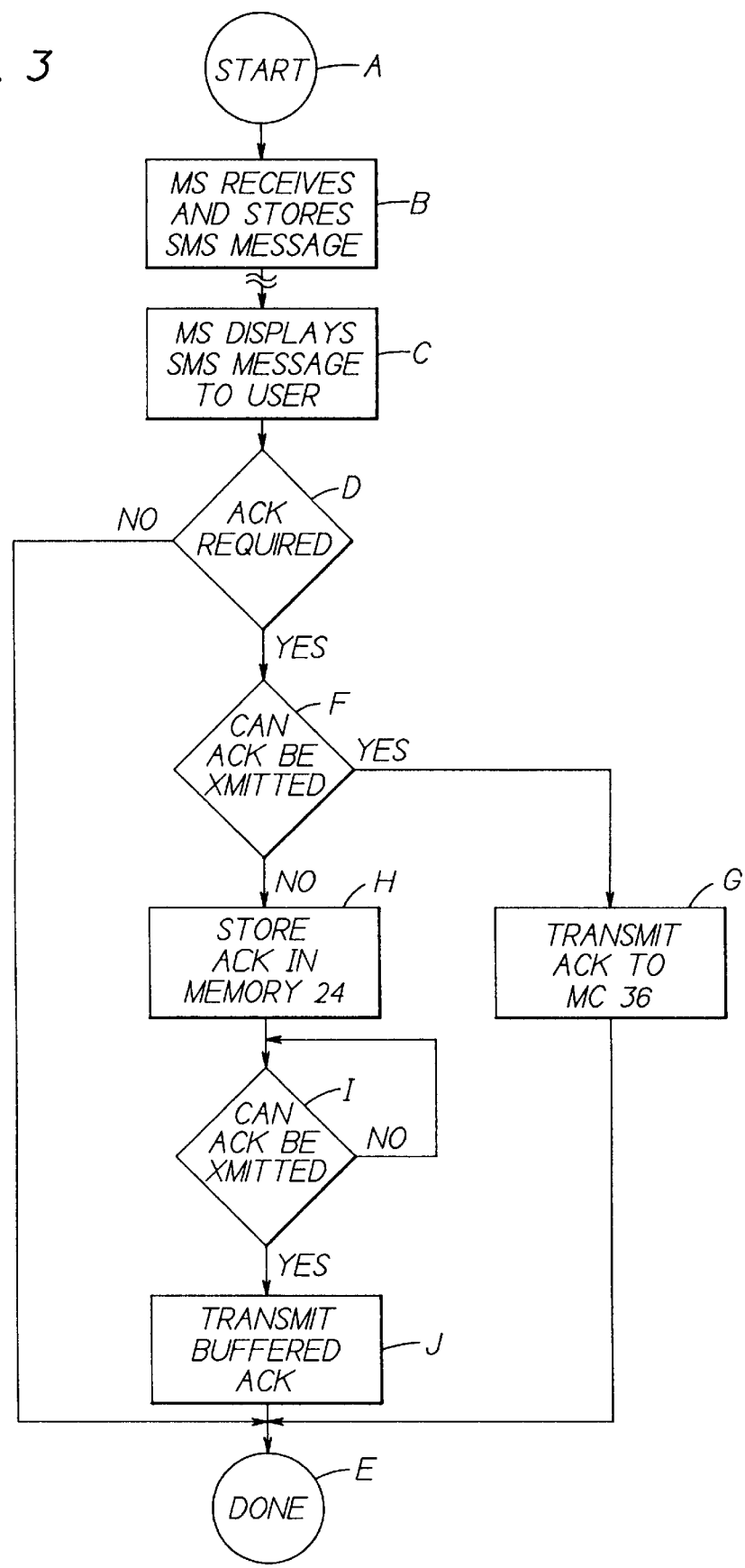
FIG. 3 is a logic flow diagram that illustrates a first method in accordance with this invention for buffering SMS acknowledgement messages.

Reference is now made to FIG. 3 for illustrating a first method in accordance with this invention. The method starts at Block A, and at Block B the mobile station 10 receives and stores one or more SMS messages (either point-to-point or point-to-multipoint) under control of the controller 18. The stored SMS message(s) 24a are located, preferably, in a non-volatile portion of the memory 24, as was previously described. At some subsequent time the user interacts with the keypad 22 and display 20, and the controller 18 accesses the memory 24 and retrieves and displays a SMS message on the display 20. Control then passes to Block D where the controller 18 determines from information elements of the displayed SMS message whether an acknowledgment is required (either Delivery ACK or Manual ACK). If No, control passes to Block E where the method terminates (unless there are other SMS messages 24a to display to the user). If it is determined at Block D that an acknowledgment is required, control passes to Block F where the controller 18 determines if the acknowledgment (Delivery ACK and/or Manual ACK) can be transmitted.

The determination at Block F can be made in a number of ways. For example, the controller 18 may scan the physical or logical downlink channels in an attempt to locate a DCCH having uplink SMS capability. If such a DCCH is found it is assumed that the current network supports SMS. However, the location of a suitable DCCH does not automatically imply that the acknowledgment message can be transmitted. For example, the DCCH may be constrained in the length of the acknowledgment message and, if the acknowledgment message to be transmitted exceeds this length, then the acknowledgment message is deemed not to be able to be transmitted. Also, and even if a suitable DCCH is located, the current radio channel conditions may not be suitable for transmitting the acknowledgment message. For example, and referring again to FIG. 1, a received signal strength indicator (RSSI) may below some threshold level and/or a bit error rate (BER) or a word error rate (WER) indicator may be above a predetermined threshold. Also by example, and referring again to FIG. 2, the mobile station 10 may have received the SMS message when connected to the $BMI_1$, but has since roamed into the coverage area of $BMI_2$. If the $BMI_2$ is an analog network, assuming that the mobile station 10 is a dual mode terminal, then the SMS ACK message cannot be transmitted.

In any event, if it is determined at Block F that the SMS ACK message can be transmitted control passes to Block G where the controller 18 formats and transmits a suitable SMS Delivery and/or Manual ACK message. However, if it is determined at Block F that the acknowledgment cannot be transmitted, control passes to Block H where the SMS ACK message is stored in the memory 24 for subsequent transmission (see FIG. 1, SMS ACKs 24b).

It is within the scope of this invention for the controller 18 to also time-tag the stored SMS ACK message 24b so as to indicate a time at which the corresponding SMS message was delivered and/or manually acknowledged by the user. This embodiment assumes that the mobile station 10 includes a real time clock (RTC) 25, or otherwise can determine the time of day, such as by a message sent from the BMI 32 (e.g., see IS-136.1, Rev. A, Section 6.4.1.2.2.7.).

Whether the SMS ACK message is time-tagged or not, control then passes to Block I where the controller 18 periodically determines whether a stored SMS ACK message 24b can be transmitted. The criteria used for this determination can be the same as that used in Block F, as described above.

It is assumed that eventually the controller 18 will determine that the stored SMS ACK message 24b can be transmitted. At this time control passes to Block J where one or more of the buffered SMS ACK messages 24b are transmitted from the mobile station 10 back to the originating MC 36. If the messages were time-tagged as described above, then the time-tag information is appended to the SMS ACK message. Control then passes to Block E where the method terminates.

It is within the scope of the invention to inform the user at Block H that a required acknowledgment message has not been transmitted, but has been stored instead in the memory 24b. The user can then also be informed by a displayed message when the acknowledgments are transmitted at Block J.

Although described thus far in the context of the buffering and subsequent transmission of SMS acknowledgment messages, the teaching of this invention can also be extended to the buffering and subsequent transmission of user-originated SMS messages. For example, the user composes a SMS message using the keypad 22 and display 20. The user then commands the mobile station 10 to transmit the SMS message. However, if for any reason the mobile station 10 is unable to transmit the SMS message, for example the current network does not support SMS teleservices or the RF channel conditions are not suitable, the mobile station 10 stores the user-originated SMS message in the memory 24a. The controller 18 then periodically determines (as in Block I of FIG. 3) whether the stored SMS message can be transmitted. When it can, the controller 18 transmits the SMS message and optionally informs the user through a displayed message that a previously buffered SMS message has been transmitted.

Figure 4:
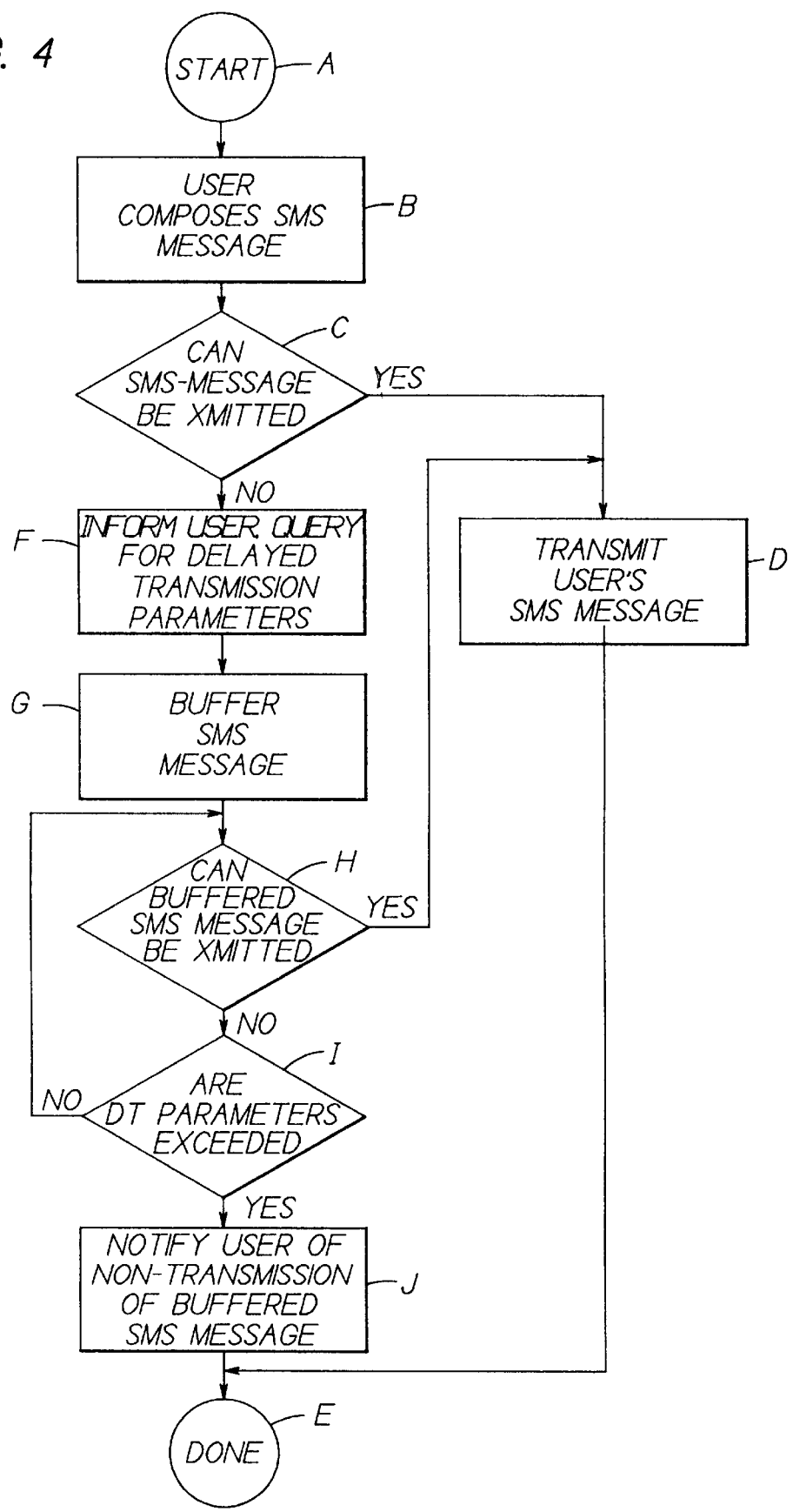
FIG. 4 is a logic flow diagram that illustrates a second method in accordance with this invention for buffering user-originated SMS messages.

In greater detail, and referring to FIG. 4, the method starts at Block A and at Block B the user composes one or more SMS messages. In response to the completion of the user composing the SMS message, the controller 18 determines at Block C if the SMS message can be transmitted (see the discussion of Block F of FIG. 3). If the SMS message can be transmitted, control passes to Block D where the controller 18 transmits the user's SMS message. The method then terminates at Block E. If the determination at Block C is negative, control passes to Block F where the user is informed that the SMS message cannot be transmitted at the present time.

It is also within the scope of this invention to then query the user for one or more delayed transmission (DT) parameters. One delayed transmission parameter may be a maximum amount of time that the SMS message can be buffered without being transmitted. By example, if the user's message concerns a meeting to be held at 2:00 p.m., the user may specify that, unless the SMS message can be transmitted prior to 1:30 p.m., the SMS message should not be transmitted. This enables the mobile station 10 to avoid the transmission of out-of-date time-critical SMS messages, thereby eliminating unnecessary cost and DCCH bandwidth utilization. Another DT parameter may be a priority level for buffered user-originated SMS messages. By example, the user may assign a priority to each of three buffered SMS messages so that a most important SMS message is transmitted first, when conditions allow, followed by the remaining messages in priority order. The delayed transmission parameters, if employed, are stored in the memory 24 in a DT buffer 24c.

At Block G the user's SMS message is transferred from a temporary buffer region where the message was composed to a non-volatile portion of the memory 24 (e.g. the SMS message buffer 24a). At Block H of the controller 18 periodically determines if the buffered SMS message 24a can be transmitted. If YES, control passes to Block D to transmit the message. If No, control passes to Block I to determine if any delayed transmission parameters have been met or exceeded. If NO, the method loops between Blocks H and I until either the message can be transmitted or one of the DT parameters is met or exceeded. At this time control passes to Block J to notify the user of the non-transmission of a buffered SMS message. In response, the user may choose to cancel the buffered SMS message, or to revise the SMS message, or to revise one or more of the delayed transmission parameters. For example, if the meeting were originally scheduled for 2:00 p.m. the user may wish to compose a new message that resets the meeting time to 3:00 p.m., while also entering 2:30 p.m. as a new DT parameter. In this case control can pass back to Blocks G, H and I.

Although described in the context of CMT, in particular SMS, it will be realized by those skilled in the art that the teaching of this invention applies to a number of cellular communications and other wireless environments wherein messages can be received and/or transmitted, with one or more different types of acknowledgment messages being required. For example, and in the context of IS-136, the teaching of this invention applies in general to the R-Data relay messages.

Although described in the context of preferred embodiments, it should be realized that a number of modifications to these teachings may occur to one skilled in the art. By example, certain steps shown in the logic flow diagrams of FIGS. 3 and 4 could be executed in other than the order shown, while still obtaining the same result. Also, and as was indicated previously, the teachings of this invention are not intended to be limited to only one air interface standard or protocol, such as IS-136. Further by example, the mobile station 10 is not constrained to only using the keypad 22 and display 20 for interacting with the user, but could also employ an external display and/or keypad or keyboard through a suitable data interface to the controller 18.

Thus, while the invention has been particularly shown and described with respect to preferred embodiments thereof, it will be understood by those skilled in the art that changes in form and details may be made therein without departing from the scope and spirit of the invention.

What is claimed is:

1. A mobile station having a receiver for receiving one of a point-to-point or a point-to-multipoint message from a cellular network, a transmitter, a memory, and a user interface, said mobile station further comprising a controller responsive to a received message for storing the received message in the memory and for subsequently delivering the stored message to a user with said user interface, said controller being operable for determining if the delivered message requires an acknowledgement message to be transmitted back to the cellular network, and if an acknowledgement message is required to be transmitted, for determining if the acknowledgement message can be transmitted and, if not, for buffering the acknowledgement message in the memory for transmission when the acknowledgement message can be transmitted, said controller being operable for subsequently automatically transmitting the buffered acknowledgement message when the controller determines that the acknowledgement message can be transmitted.

2. A mobile station as set forth in claim 1, wherein the message and acknowledgement message use an R-Data message.

3. A mobile station as set forth in claim 1, wherein the message is a Short Message Service (SMS) message, and wherein the acknowledgement message is one of a SMS Delivery Acknowledgement message or a SMS Manual Acknowledgement message.

4. A mobile station as set forth in claim 1, wherein said controller includes means for time-tagging a buffered acknowledgement message with a time that the message was delivered, and wherein the controller, when automatically transmitting the buffered acknowledgement message, appends the time to the acknowledgement message.

5. A mobile station having a transmitter for transmitting a point-to-point message to a cellular network, a receiver, a memory, and a user interface, said mobile station further comprising a controller responsive to input from a user for composing a point-to-point message, said controller being further responsive to said receiver for determining if the composed message can be transmitted to the cellular network and, if not, for buffering the composed message in the memory for transmission when the message can be transmitted, said controller being further operable for subsequently automatically transmitting the buffered message when the controller determines that the message can be transmitted.

6. A mobile station as set forth in claim 5, wherein the message is transmitted as an R-Data message.

7. A mobile station as set forth in claim 5, wherein the message is a Short Message Service (SMS) message.

8. A mobile station as set forth in claim 5, wherein said controller is further operable, when the message cannot be transmitted, for querying the user for at least one delayed transmission parameter and for storing at least one user-entered delayed transmission parameter in the memory, said controller subsequently automatically transmitting the buffered message in accordance with the stored at least one delayed transmission parameter.

9. A method for operating a cellular communications system of a type that comprises a Base Station/Mobile Switching Center/Interworking function (BMI), comprising the steps of:

transmitting one of a point-to-point or a point-to-multipoint message from the BMI to a mobile station;

receiving, storing, and subsequently delivering the message with the mobile station;

determining if the delivered message requires an acknowledgement message to be transmitted;

if an acknowledgement message is required, determining if the acknowledgement message can be transmitted;

if not, buffering the acknowledgement message in the mobile station for transmission when the acknowledgement message can be transmitted; and subsequently automatically transmitting the buffered acknowledgement message when the mobile station determines that the acknowledgement message can be transmitted.

10. A method as set forth in claim 9, wherein the steps of transmitting use an R-Data message.

11. A method as set forth in claim 9, wherein the message is a Short Message Service (SMS) message, and wherein the acknowledgement message is one of a SMS Delivery Acknowledgement message or a SMS Manual Acknowledgement message.

12. A method as set forth in claim 9, wherein the step of buffering includes a step of time-tagging the buffered acknowledgement message with a time that the message was displayed, and wherein the step of automatically transmitting the buffered acknowledgement message includes a step of appending the time to the acknowledgement message.

13. A method for operating a mobile station of a type that is operable with a cellular communications system, comprising the steps of:

composing a point-to-point message in the mobile station;

determining if the composed message can be transmitted to the cellular communications system;

if not, buffering the composed message in the mobile station for transmission when the message can be transmitted; and subsequently automatically transmitting the buffered message when the mobile station determines that the message can be transmitted.

14. A method as set forth in claim 13, wherein the step of transmitting uses an R-Data message.

15. A method as set forth in claim 14, wherein the message is a Short Message Service (SMS) message.

16. A method as set forth in claim 14, wherein the step of buffering includes the steps of:

querying a user for at least one delayed transmission parameter;

storing at least one user-entered delayed transmission parameter in the mobile station; and subsequently automatically transmitting the buffered message in accordance with the stored at least one delayed transmission parameter.

17. A method for operating mobile station operable with a cellular communications system, comprising the steps of:

composing a point-to-point Short Message Service (SMS) message in the mobile station;

determining if the composed SMS message can be transmitted;

if not, buffering the composed SMS message in the mobile station for transmission when the buffered SMS message can be transmitted;

prompting the user to enter a time up to which the buffered SMS message can be transmitted;

storing the entered time;

periodically determining if the buffered SMS message can be transmitted; and subsequently automatically transmitting the buffered message when the mobile station determines that the message can be transmitted, and that the current time is not later than the stored time.

18. A method as set forth in claim 17, wherein the step of periodically determining also determines if the current time is later than the stored time and, if it is, the method includes a step of notifying the user that the buffered SMS message was not transmitted before the stored time.

19. A method for operating a cellular communications system of a type that comprises a digital cellular network, comprising the steps of:

transmitting one of a point-to-point or a point-to-multipoint SMS message from the network to a mobile station;

receiving, storing, and subsequently delivering the SMS message with the mobile station;

determining if the delivered SMS message requires a SMS acknowledgement message to be transmitted;

if a SMS acknowledgement message is required, determining if the SMS acknowledgement message can be transmitted, the step of determining if the SMS acknowledgement message can be transmitted including a step of determining at least one of (a) if a current network, if any, to which the mobile station is coupled though an RF channel supports the transmission of the SMS acknowledgement message, or (b) if current RF channel conditions support the transmission of the SMS acknowledgement message;

if not, buffering the SMS acknowledgement message in the mobile station for transmission when the SMS acknowledgement message can be transmitted; and automatically transmitting the buffered SMS acknowledgement message when it is determined that the SMS acknowledgement message can be transmitted.

20. A method for operating a cellular communications system of a type that comprises a network and at least one mobile station capable of bidirectional wireless communications with the network, comprising the steps of:

transmitting a Cellular Messaging Teleservice (CMT) message from the network to the mobile station;

receiving the message, storing the message, and subsequently delivering the message to a user of the mobile station, the step of delivering including a step of determining if the delivered message requires an acknowledgement message to be transmitted to the network;

if an acknowledgement message is required to be transmitted, generating an acknowledgement message and then determining if the acknowledgement message can be transmitted at the current time;

if not, buffering the acknowledgement message in the mobile station for transmission at a time when the acknowledgement message can be transmitted; and subsequently automatically transmitting the buffered acknowledgement message when the mobile station automatically determines that the acknowledgement message can be transmitted.

* * * * *